April 18, 1933.  H. T. HUNTER  1,904,370
AUTOMATIC COOKING APPARATUS
Filed Nov. 15, 1930
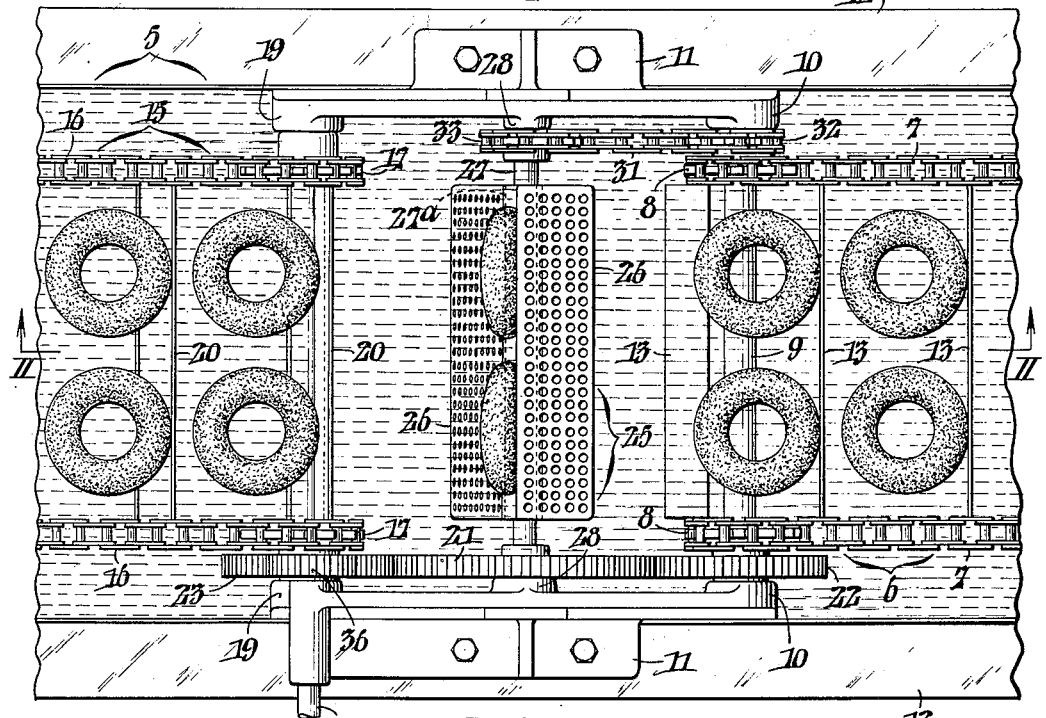
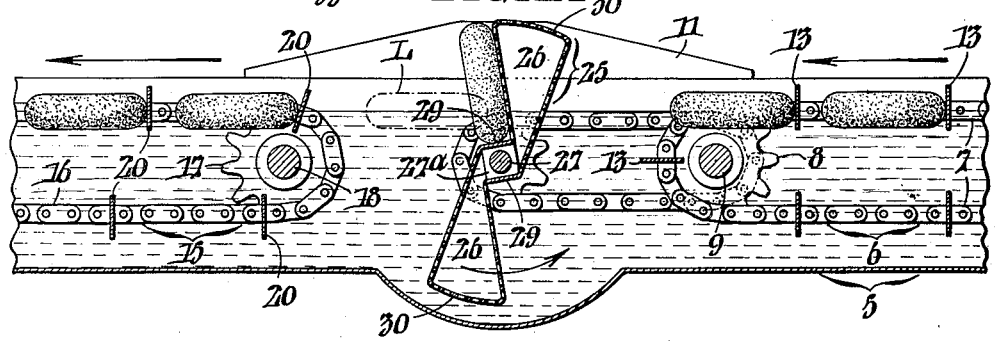
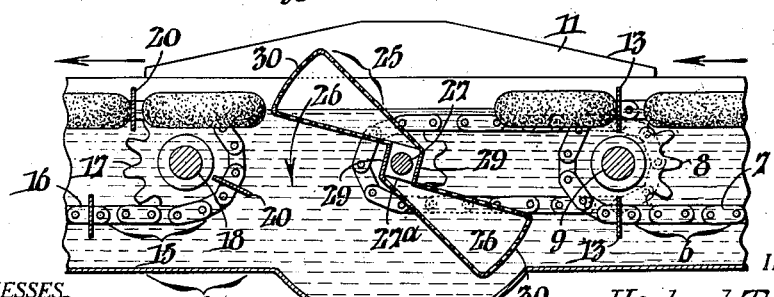
INVENTOR.
Herbert T. Hunter
BY Fraley Paul
ATTORNEY.

Patented Apr. 18, 1933                                                                1,904,370

UNITED STATES PATENT OFFICE

HERBERT T. HUNTER, OF BALTIMORE, MARYLAND, ASSIGNOR TO DOUGHNUT MACHINE CORPORATION, OF NEW YORK, N. Y., A CORPORATION OF NEW YORK

AUTOMATIC COOKING APPARATUS

Application filed November 15, 1930. Serial No. 495,896.

This invention relates to apparatus for automatically cooking doughnuts and the like, and has reference more particularly to straight-away doughnut machines of the kind disclosed in an application, Serial No. 311,609 filed by me on October 10, 1928; and which later matured into Patent No. 1,814,930, dated July 14, 1931.

In cooking apparatus of the specific type referred to, the raw doughnuts are dropped successively into one end of an elongated receptacle containing hot cooking liquor, and advanced therealong by a slowly moving progressing means having individual cells to maintain the doughnuts definitely separated in the liquor. After progression substantially half of the length of the receptacle afloat on one side in the liquor, the doughnuts are individually inverted by an intermittently actuated flipping device incident to transfer from the cells of the aforesaid progressing means to the cells of a second cellular progressing means by which they are conveyed to the opposite end of the receptacle afloat on their opposite sides in the liquor, and finally ejected from the apparatus.

The main object of my present invention is to secure smoother operation of such cooking apparatus through provision of a simple rotary turnover means with vanes whereby the doughnuts are successively engaged from beneath and inverted incident to transfer from the cells of the one progressing means to the cells of the other, while both said progressing means are in continuous motion.

A further object of my invention is to make provisions in connection with such a turnover that will prevent the creation of eddy currents likely to hinder the progress of the doughnuts after inversion and to cause their being fouled by the barriers setting apart the cells of the aforementioned second conveyor.

Another object of my invention is to embody in the construction of the turnover vanes, reacting surfaces for the gases forcibly expelled from the doughnuts immediately after inversion and reintroduction into the cooking liquor, thereby to assist their subsequent advance into the province of the second conveyor of the cooking apparatus.

Still other objects and attendant advantages of this invention will be manifest from the following detailed description taken in connection with the attached drawing.

Fig. I is a partial plan view of a straight-away doughnut machine conveniently embodying the present improvements.

Fig. II is a longitudinal sectional view of the apparatus taken as indicated by the arrows II—II in Fig. I; and Fig. III is a view somewhat corresponding with the preceding illustration but showing the "turnover" in a different position.

As in the patent supra, the apparatus herein shown comprises an elongated receptacle 5 for the cooking liquor L which is maintained substantially at the level indicated in Fig. II. Raw doughnuts released in pairs by a suitable forming means, such as disclosed in the patent, are conveyed along a portion of the receptacle 5, afloat on one side in the liquor L, by a progressing means 6 having the form of an endless horizontal conveyor with spaced side chains 7 trained over sprockets whereof one end pair is shown at 8. These sprockets 8 are mounted on a transverse shaft 9 which rotates in depending journals 10 afforded by a pair of brackets 11 respectively bolted to the side rails 12 of a frame that supports the receptacle 5. At uniformly spaced intervals the chains 7 carry between them cross bars 13 which set apart a series of cells whereby the individual pairs of doughnuts are maintained in definite separation during progression along the receptacle 5. A second and similar progressing means 15 serves to convey the doughnuts, after transfer thereto inverted in a manner presently explained, along the remaining portion of the receptacle 5, from the opposite end of which said doughnuts are finally discharged exactly as in the patent aforementioned. The side chains 16 of the second progressing conveyor 15 run about sprocket wheels whereof one end pair is indicated at 17, said wheels being secured to a shaft 18 supported at its ends in another pair of bearing journals 19 on the brackets 11. Similarly also, the side chains 16 of the second progressing conveyor 15 carry between them a series of cross bars 20 that define cells for the individual pairs of doughnuts. The progressing conveyors 6 and 15 are coordinated for continuous movement in unison by a train of gears including an idler 21 which is in mesh with gear wheels 22, 23 secured respectively to the sprocket shafts 9 and 18.

The interval between the contiguous end sprockets 8, 17 of the progressing conveyors 6, 15 is occupied by a rotary turnover 25 having two paddles or vanes 26. The shaft 27 of this turnover 25 is supported for rotation, beneath the level of the cooking liquor L, in bearing bosses 28 centrally of the brackets 11, the idler gear 21 previously referred to rotating free on the said shaft. As shown, the medial portion 27a of the shaft 27 is square; and the vanes 26 of the turnover 25 are attached to opposite sides of this squared portion in tangential relation, with formation of steps or heels at 29 for a purpose later on explained. It will be noted that the vanes 26 are hollow and sector shaped in cross section, while they have comparatively broad curved circumferential faces or tips 30 in concentric relation to the shaft 27. As shown, the vanes 26 are made from perforated sheet metal to the described configuration with all the joints welded together for greater strength and rigidity, and permanently secured to the shaft 27, also preferably by welding. The turnover 25 is continuously and positively rotated in synchronism with the slowly moving progressing conveyors 6, 15 through the medium of a sprocket chain 31 that connects sprocket wheels 32, 33 respectively secured to the sprocket shaft 9 of the conveyor 6 and the shaft 27 of said turnover. The apparatus may be driven in any convenient manner, for example, through power applied to a shaft 35 carrying a pinion 36 (Fig. I) in mesh with the gear wheel 23 on the sprocket 18.

The operation of the apparatus is as follows: As a pair of the doughnuts D is released by the first conveyor 6, they float into the province of the continuously rotating turnover 25 so as to be engaged by that vane 26 which is at the time rising in the liquor L, as in Fig. III. The two doughnuts are thereby gradually lifted from the liquor L, and when brought to a position slightly beyond the vertical resting on the step or heel 29, associated with the active vane 26 as in Fig. II, they fall back into the liquor L inverted. Then by the normal motion of the liquor L the doughnuts are carried into the province of the second progressing conveyor 15 and are eventually engaged from behind by the conveyor cross bar 20 at the time rounding the sprockets 17 in a manner which will be obvious from Fig. III. The perforated construction of the turnover 25 is of great importance to its successful operation firstly in that free circulation of the liquor L is permitted through the hollow vanes 26 with minimization of the resistance to the rotation, and secondly in that the formation of eddy currents likely to prevent or retard the progression of the turned doughnuts is avoided as said vanes descend into the liquor L as in Fig. II, the possibility of the doughnuts being fouled by the up-coming cross bar 20 of the conveyor 15 being thus effectively precluded. The described shape of the turnover blades 26 is likewise very important in that it affords the comparatively broad curved surfaces 30 which prevent the inverted doughnuts after having been fully advanced from backing into interference with the turnover 25, i. e. they serve to keep the doughnuts out of the circle described by said turnover after they have been inverted. Immediately upon re-introduction into the liquor L incident to inversion a considerable amount of gas is forcibly expelled in all directions by the doughnuts. The curved portions 30 of the turnover vanes 26 provide surfaces against which this released gas can re-act and thereby assist in driving the inverted doughnuts forward to the conveyor 15.

Having thus described my invention, I claim:

1. In apparatus for cooking doughnuts and the like in hot liquor, an elongated receptacle for the cooking liquor; a progressing means with individual cells to maintain the doughnuts definitely separated in the liquor while converging them along a portion of the receptacle; a second and similar progressing means with cells for conveying the doughnuts in definite separation in the liquor along the remaining portion of the receptacle; and a synchronized rotary turnover for engaging the doughnuts individually from beneath to invert them incident to transfer from the cells of the first progressing means to the cells of the second progressing means, each said vane embodying a broad curved tip effective to prevent backing of the inverted doughnuts.

2. In apparatus for cooking doughnuts and the like in hot liquor, an elongated receptacle for the cooking liquor; an endless horizontal conveyor having transverse bars setting apart a series of individual cells to maintain the doughnuts definitely separated during conveyance along a portion of the receptacle; a second endless progressing conveyor likewise with cross bars for maintaining the doughnuts in definite separation during conveyance along the remaining portion of the receptacle; and a synchronized rotary turnover of perforate material and occupying an interval between the end sprockets of the two conveyors and having vanes for successively engaging the doughnuts individually from beneath when freed by the first conveyor to invert the doughnuts incident to delivering them to the second conveyor, each said vane embodying a broad tip, concentric with the turnover axis of rotation, effective to prevent backing of the inverted doughnuts and also serving as a reaction surface for the doughnut released gases to aid in directing the released doughnuts toward the second conveyor aforesaid.

3. In apparatus for cooking doughnuts and the like in hot liquor, an elongated receptacle for the cooking liquor; a progressing means with individual cells to maintain the doughnuts definitely separated in the liquor while conveying them along a portion of the receptacle; a second and similar progressing means for conveying the doughnuts likewise in definite separation in the liquor along the remaining portion of the receptacle; and a synchronized rotary turnover of perforate material with vanes for engaging the doughnuts individually from beneath to invert them incident to transfer from the cells of the first progressing means to the cells of the second progressing means, the vanes of said turnover embodying broad tips concentric to the axis of rotation and being tangential to its shaft with formation of angular heel portions to support the doughnuts on edge during inversion.

4. In apparatus for cooking doughnuts and the like in hot liquor, an elongated receptacle for the cooking liquor; a progressing means with individual cells to maintain the doughnuts definitely separated in the liquor while conveying them along a portion of the receptacle; a second and similar progressing means for conveying the doughnuts likewise in definite separation in the liquor along the remaining portion of the receptacle; and a synchronized rotary turnover with vanes for individually engaging the doughnuts from beneath to invert them incident to transfer from the cells of the first progressing means to the cells of the second progressing means, the vanes of said paddle wheel being hollow and sector shaped in cross section and perforated for free passage of the cooking liquor through them.

5. In apparatus for cooking doughnuts and the like in hot liquor, an elongated receptacle for the cooking liquor; a progressing means with individual cells to maintain the doughnuts definitely separated in the liquor while conveying them along a portion of the receptacle; a second and similar progressing means for conveying the doughnuts likewise in definite separation in the liquor along the remaining portion of the receptacle; and a synchronized rotary turnover with vanes for engaging the doughnuts individually from beneath to turn them over incident to transfer from the cells of the first progressing means to the cells of the second progressing means, the vanes of said paddle wheel being of hollow sector shaped cross section and perforated for free passage of the cooking liquor through them, and tangential relative to the turnover shaft with formation of heels to support the doughnuts on edge during inversion.

6. In apparatus for cooking doughnuts and the like in hot liquor, an elongated receptacle for the cooking liquor; a progressing means with individual cells to maintain the doughnuts definitely separated in the liquor while conveying them along a portion of the receptacle; a second and similar progressing means with cells for conveying the doughnuts in definite separation in the liquor along the remaining portion of the receptacle; and a synchronized rotary turnover for transferring the doughnuts from the first progressing means to the second, the said turnover having hollow vanes affording circumferential reacting surfaces for gases forcibly expelled from the doughnuts after inversion, for the purpose of assisting the advance of the doughnuts to the said second progressing means.

7. In apparatus for cooking doughnuts and the like in hot liquor, an elongated receptacle for the cooking liquor; a progressing means with individual cells to maintain the doughnuts definitely separated in the liquor while conveying them along a portion of the receptacle; a second and similar progressing means with cells for conveying the doughnuts in definite separation in the liquor along the remaining portion of the receptacle; and a synchronized rotary turnover for transferring the doughnuts from the first progressing means to the second, the said turnover having hollow vanes perforated for free passage of the cooking liquor to obviate the creation of eddy currents likely to prevent advance of the doughnuts after inversion, and affording circumferential reacting surfaces for the gases forcibly expelled from the doughnuts after inversion for the purpose of assisting the advance of the doughnuts to the said second conveying means.

8. A rotary turnover device comprising a shaft, vanes arranged tangentially relative to said shaft with formation of heels to support the doughnuts on edge during inversion, and said vanes each embodying a broad tip concentric with the axis of rotation of the turnover device.

9. A rotary turnover device comprising a shaft, hollow vanes of sector shaped cross-section having angular heel portions to support the doughnuts on edge during inversion, and broad tips concentric with the axis of rotation of the turnover device.

10. A rotary turnover device comprising a shaft, vanes of hollow sectoral shaped cross-section in the plane of their direction of rotation and having angular heel portions to support the doughnuts on edge during inversion, said vanes being perforated for free passage of liquid through them and each embodying a broad tip concentric with the axis of rotation of the turnover device.

In testimony whereof, I have signed my name at Ellicott City, Maryland, this 13th day of November, 1930.

HERBERT T. HUNTER.